US008225518B2

(12) United States Patent
Yanobe et al.

(10) Patent No.: US 8,225,518 B2
(45) Date of Patent: Jul. 24, 2012

(54) MANUAL SURVEYING INSTRUMENT HAVING COLLIMATION ASSISTING DEVICE

(75) Inventors: Satoshi Yanobe, Kanagawa (JP); Yutaka Nakamura, Kanagawa (JP)

(73) Assignee: Sokkia Topcon Co. Ltd., Atsugi-Shi (JP)

( * ) Notice: Subject to any disclaimer, the term of this patent is extended or adjusted under 35 U.S.C. 154(b) by 13 days.

(21) Appl. No.: 13/057,785

(22) PCT Filed: May 29, 2009

(86) PCT No.: PCT/JP2009/059866
§ 371 (c)(1),
(2), (4) Date: Feb. 7, 2011

(87) PCT Pub. No.: WO2010/047146
PCT Pub. Date: Apr. 29, 2010

(65) Prior Publication Data
US 2011/0131824 A1    Jun. 9, 2011

(30) Foreign Application Priority Data

Oct. 21, 2008 (JP) .................................. 2008-270543

(51) Int. Cl.
*G01C 5/00* (2006.01)
(52) U.S. Cl. ......................................................... 33/292
(58) Field of Classification Search .................... 33/290, 33/291, 292, 293
See application file for complete search history.

(56) References Cited

U.S. PATENT DOCUMENTS 4,691,444 A * 9/1987 Capps ............................. 33/290
6,988,319 B2 * 1/2006 Hung ............................... 33/291
7,444,760 B2 * 11/2008 Hoffmann et al. ............... 33/291
7,861,423 B2 * 1/2011 Kumagai et al. ................ 33/290
(Continued)

FOREIGN PATENT DOCUMENTS

JP      7083657      3/1995
(Continued)

OTHER PUBLICATIONS

International Search Report PCT/JP2009/059866 dated Jul. 14, 2009.

*Primary Examiner* — G. Bradley Bennett
(74) *Attorney, Agent, or Firm* — Roberts Mlotkowski Safran & Cole, P.C

(57) ABSTRACT

[Problem] To provide a manual surveying instrument that allows easily performing a collimating operation and allows performing a high precision measurement in a short time.
[Solution Means] The manual surveying instrument includes a collimation assist device (70) having a collimation light transmitting system that emits a collimation light (R) along a collimation axis (O) toward a target installed at a measurement point, an area sensor (80) that obtains an image of a scene captured within a field of view of a collimating telescope (3), a display unit (48) that displays the image, a collimation light detecting unit (82) that detects the target as a result of receiving the collimation light reflected on the target by the area sensor, and an arithmetic control unit (46) that displays an area (94) being within a predetermined deviation from the collimation axis and where distance measurement is possible and a symbol indicating the target on the display unit as an animation image, judges that collimation has been completed when the target has been captured, by a manual operation of the collimating telescope, within the area where distance measurement is possible to perform a distance and angle measurement, and corrects an angle measurement value according to a deviation from the collimation axis of the target.

10 Claims, 5 Drawing Sheets

U.S. PATENT DOCUMENTS

| | | | |
|---|---|---|---|
| 2004/0163266 A1* | 8/2004 | Kaneko | 33/290 |
| 2006/0092286 A1* | 5/2006 | Velhal et al. | 33/292 |
| 2010/0186243 A1* | 7/2010 | Schumacher | 33/290 |

FOREIGN PATENT DOCUMENTS

| | | |
|---|---|---|
| JP | 2003279351 A | 10/2003 |
| JP | 2004-61245 | 2/2004 |
| JP | 2004-85551 | 3/2004 |
| JP | 3748112 | 12/2005 |
| JP | 2006-38683 | 2/2006 |
| JP | 2008-32701 | 2/2008 |

* cited by examiner

MANUAL SURVEYING INSTRUMENT HAVING COLLIMATION ASSISTING DEVICE

TECHNICAL FIELD

The present invention relates to a manual surveying instrument (mainly, a total station) including a collimation assist device that facilitates a collimating operation of the manual surveying instrument. The total station includes a distance measuring unit by a laser beam, an angle measuring unit, a collimating telescope unit, and a leveling unit, and measures the distance and azimuth angle up to a survey point.

BACKGROUND ART

In the above-mentioned manual surveying instrument, a collimating operation is necessary at the time of measurement so that a target such as a prism is located on a collimation axis. The collimating operation is to turn the collimating telescope around so as to be trained upon the target, capture the target within a field of view of the collimating telescope, and align, by means of a coarse and fine motion mechanism provided in the surveying instrument, the target with the center (collimation axis) of crosshairs observed within the field of view of the collimating telescope.

Meanwhile, in the above-mentioned manual surveying instrument, collimation errors according to observer proficiency have existed, and in the case of an inexperienced observer, there has been a problem that the observer can perform only highly erroneous measurements even by use of a valuable high-precision surveying instrument. Moreover, there has also been a problem that, in an atmosphere with much shimmering such as heat haze, it is difficult even for an experienced observer to perform an accurate collimation, and the observer can perform only highly erroneous measurements.

In order to solve such problems, there has been proposed, in the following patent document 1, a surveying instrument that allows obtaining an accurate angle measurement value even when collimation of the target is somewhat imperfect. This surveying instrument will be described based on FIG. 4.

A collimating telescope 3 of this surveying instrument includes an objective lens 11, a focusing lens 14, a focusing glass 15, and an eyepiece 12 on an collimation axis O. There are crosshairs drawn on the focusing glass 15, so that an observer can perform manual collimation looking through the eyepiece 12. Moreover, this surveying instrument includes, in order to transmit an infrared laser light P along the collimation axis O, a laser diode 17, a condenser lens 18, a relay lens 19, a beam splitter 20, and a dichroic mirror 13. Further, this surveying instrument includes, in order to receive a laser light reflected on a target 23 such as a prism, the dichroic mirror 13, the beam splitter 20, a filter 21, and a light receiving element 22 such as a CCD area sensor.

When the target 23 is accurately located on the collimation axis O, the laser light P reflected on the target 23 returns along the collimation axis O, and the target 23 is imaged on a center C of the light receiving element 22. At this time, an angle measurement value (vertical angle, horizontal angle) measured by an angle measuring unit (not shown) is accurate.

On the other hand, when the target 23 has not been able to be accurately collimated, and the direction of the target 23 has a horizontal angle deviation $\Delta H$ from the direction of the collimation axis O, an angle measurement value measured by the angle measuring unit is inaccurate. However, based on a horizontal direction deviation $\Delta h$ from the center C of the light receiving element 22 being the imaging position of the target 23 on the light receiving element 22, the horizontal angle deviation $\Delta H$ can be calculated. Then, by applying to a horizontal angle H obtained from the angle measuring unit an addition subtraction correction through substituting the horizontal angle deviation $\Delta H$ for a predetermined function, an accurate horizontal angle can be obtained. An accurate vertical angle can also be obtained in the same manner.

Therefore, this surveying instrument provides an effect of allowing obtaining an accurate angle measurement value even with somewhat imperfect collimation, and also allowing shortening the time required for measurement.

As an example of another known art, there has also been disclosed, in the following patent document 2, an instrument for which a collimating telescope and a wide-angle digital camera are provided in an automatic collimation device, and which first captures a target in the vicinity of a collimation axis by the wide-angle digital camera, and then performs switching to an imaging device (area sensor) and the collimating telescope to accurately automatically collimate the target.

Patent Document 1: Japanese Patent No. 3748112
Patent Document 2: Japanese Published Unexamined Patent Application No. 2003-279351

DISCLOSURE OF THE INVENTION

Problems to be Solved by the Invention

However, in the surveying instrument described in Patent Document 1, there remains a problem that looking through the collimating telescope 3 with one eye for every measurement causes fatigue to the observer, and thus a collimating operation is not easy.

On the other hand, in the automatic collimation surveying instrument disclosed in Patent Document 2, it is not necessary to look through the collimating telescope with one eye, so that it becomes possible even for an inexperienced observer to easily perform a high precision measurement, but there has been a problem that it takes time to capture the target within a field of view of the collimating telescope and then complete the collimation, and thus a longer time is required for measurement than that with a manual surveying instrument.

The present invention has been made in view of the problems described above, and it is an object of the present invention to provide a manual surveying instrument that allows easily performing a collimating operation and allows performing a high precision measurement in a short time.

Means for Solving the Problems

In order to achieve the above-mentioned object, a manual surveying instrument according to a first aspect of the present invention includes a collimation assist device having a collimation light transmitting system that emits a collimation light along a collimation axis toward a target installed at a measurement point, an area sensor that obtains an image of a scene captured within a field of view of a collimating telescope, a display unit that displays the image, a collimation light detecting unit that detects the target as a result of receiving the collimation light reflected on the target by the area sensor, and an arithmetic control unit that displays an area indicating being within a predetermined deviation from the collimation axis and a symbol indicating the target on the display unit as an animation image, judges that collimation has been completed when the target has been captured, by a manual operation of the collimating telescope, within the area indicating being within a predetermined deviation from the collimation axis to perform an angle measuring operation, and corrects an angle measurement value according to a deviation from the collimation axis of the target.

A second aspect of the present invention provides the manual surveying instrument including a collimation assist device according to the first aspect of the present invention, in which the animation image is displayed with a deviation from the collimation axis enlarged as it approaches the collimation axis.

A third aspect of the present invention provides the manual surveying instrument including a collimation assist device according to the first or second aspect of the present invention, in which the symbol indicating the target changes in color, shape, or color and shape when having entered into the area indicating being within a predetermined deviation from the collimation axis.

A fourth aspect of the present invention provides the manual surveying instrument including a collimation assist device according to the first, second, or third aspect of the present invention, in which the symbol indicating the target changes in color, shape, or color and shape when the target has exited the field of view of the collimating telescope, and indicates a direction to return the collimating telescope.

A fifth aspect of the present invention provides the manual surveying instrument including a collimation assist device according to the first, second, third, or fourth aspect of the present invention, in which the symbol indicating the target changes in color, shape, or color and shape when the collimation light reflected from the target is excessively weak or excessively strong.

A sixth aspect of the present invention provides the manual surveying instrument including a collimation assist device according to the first, second, third, fourth, or fifth aspect of the present invention which includes a wide-angle digital camera, and in which the arithmetic control unit first displays an image obtained from the wide-angle digital camera on the display unit, displays the field of view of the collimating telescope on the display unit, and switches the image obtained from the wide-angle digital camera to the animation image when having judged that the target has been captured within the field of view of the collimating telescope.

A seventh aspect of the present invention provides the manual surveying instrument including a collimation assist device according to the first, second, third, fourth, fifth, or sixth aspect of the present invention which includes a distance measuring unit in an optical system of the collimating telescope, and in which the area indicating being within a predetermined deviation from the collimation axis is determined by an area where distance measurement by the distance measuring unit is enabled.

An eighth aspect of the present invention provides the manual surveying instrument including a collimation assist device according to the seventh aspect of the present invention, in which when the symbol indicating the target has entered into the area indicating being within a predetermined deviation from the collimation axis, distance measurement can be automatically performed.

A ninth aspect of the present invention provides the manual surveying instrument including a collimation assist device according to any one of the first to eighth aspects of the present invention, in which an illustration indicating a turning direction of the collimating telescope is displayed on the display unit in order to locate the target on the collimation axis.

A tenth aspect of the present invention provides the manual surveying instrument including a collimation assist device according to the ninth aspect of the present invention, in which the illustration indicating a turning direction of the collimating telescope is an illustration of a collimating telescope and an arrow indicating a turning direction of the collimating telescope or an illustration of a tangent screw and an arrow indicating a turning direction of the tangent screw.

Effects of the Invention

Because the manual surveying instrument according to the first aspect of the present invention includes a collimation assist device having a collimation light transmitting system that emits a collimation light along a collimation axis toward a target installed at a measurement point, an area sensor that obtains an image of a scene captured within a field of view of a collimating telescope, a display unit that displays the image, a collimation light detecting unit that detects the target as a result of receiving the collimation light reflected on the target by the area sensor, and an arithmetic control unit that displays an area indicating being within a predetermined deviation from the collimation axis and a symbol indicating the target on the display unit as an animation image, judges that collimation has been completed when the target has been captured, by a manual operation of the collimating telescope, within the area indicating being within a predetermined deviation from the collimation axis to perform an angle measuring operation, and corrects an angle measurement value according to a deviation from the collimation axis of the target, the observer can observe the animation image on the display unit with both eyes while collimating the target, even somewhat imperfect collimation will suffice, and a high-precision angle measurement can be swiftly performed by an easy collimating operation.

In the second aspect of the present invention, further, the animation image is displayed with a deviation from the collimation axis enlarged as it approaches the collimation axis, and thus the collimating operation is even easier.

In the third aspect of the present invention, further, the symbol indicating the target changes in color, shape, or color and shape when having entered into the area indicating being within a predetermined deviation from the collimation axis, and thus the completion of collimation is found, and the collimating operation is even easier.

In the fourth aspect of the present invention, further, the symbol indicating the target changes in color, shape, or color and shape when the target has exited the field of view of the collimating telescope, and indicates a direction to return the collimating telescope, and thus it can be immediately found that the target has exited the field of view of the collimating telescope, and an operation to return the target into the field of view of the collimating telescope can be promptly performed, so that the collimating operation is even easier.

In the fifth aspect of the present invention, further, the symbol indicating the target changes in color, shape, or color and shape when the collimation light reflected from the target is excessively weak or excessively strong, and thus it can be known in advance that measurement with sufficient precision is not possible.

The sixth aspect of the present invention further includes a wide-angle digital camera separate from an optical system of the collimation telescope, in which the arithmetic control unit first displays an image obtained from the wide-angle digital camera on the display unit, displays the field of view of the collimating telescope on the display unit, and switches the image obtained from the wide-angle digital camera to the animation image when having judged that the target has been captured within the field of view of the collimating telescope, and thus the target can be swiftly captured within the field of view of the collimating telescope, the collimating operation is even easier, and a swift measurement is enabled.

The seventh aspect of the present invention further includes a distance measuring unit in an optical system of the collimating telescope, in which the area indicating being within a predetermined deviation from the collimation axis is determined by an area where distance measurement by the distance measuring unit is enabled, and thus a high-precision distance measurement can also be swiftly performed by an easy collimating operation.

In the eighth aspect of the present invention, further, when the symbol indicating the target has entered into the area indicating being within a predetermined deviation from the collimation axis, distance measurement can be automatically performed, and thus the collimating operation is even more easier, and a swift measurement is enabled.

In the ninth aspect of the present invention, further, an illustration indicating a turning direction of the collimating telescope is displayed on the display unit in order to locate the target on the collimation axis, and thus even a beginner no longer turns the collimation telescope in the wrong direction, and the collimating operation becomes even easier.

In the tenth aspect of the present invention, further, the illustration indicating a turning direction of the collimating telescope is an illustration of a collimating telescope and an arrow indicating a turning direction of the collimating telescope or an illustration of a tangent screw and an arrow indicating a turning direction of the tangent screw, and thus even a beginner can always perform an appropriate collimating operation.

DESCRIPTION OF REFERENCE NUMERALS

Figure 1:
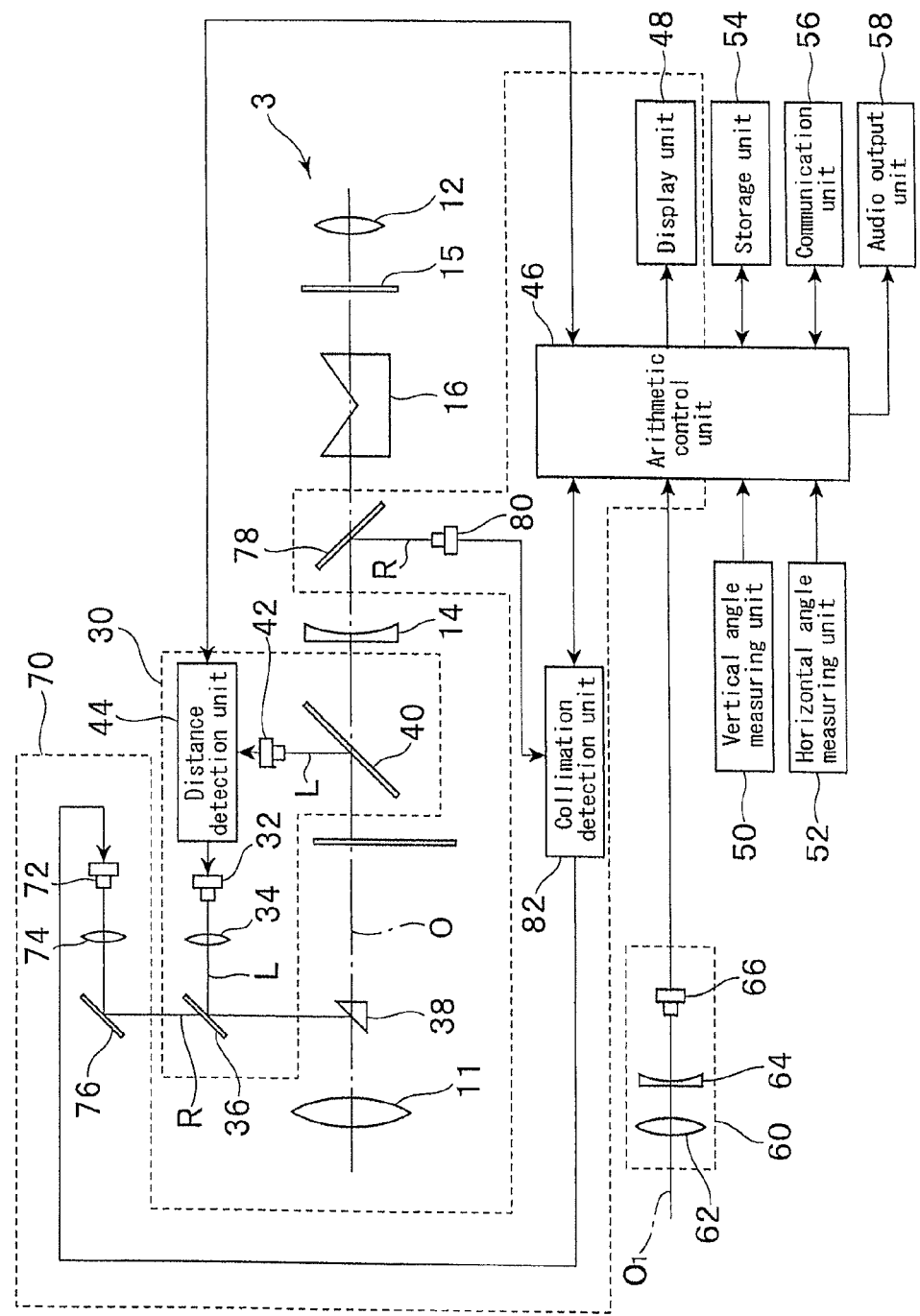
FIG. 1 is a block diagram of a surveying instrument according to a first embodiment of the present invention.

3 Collimating telescope
30 Distance measuring unit
46 Arithmetic control unit
48 Display unit
60 Wide-angle digital camera
70 Collimation assist device
80 Area sensor
84 Target
88 Field of view of collimating telescope
90 Point indicating collimation axis
92 Symbol indicating target
94 Area where distance measurement is possible
O Collimation axis

BEST MODE FOR CARRYING OUT THE INVENTION

Figure 2:
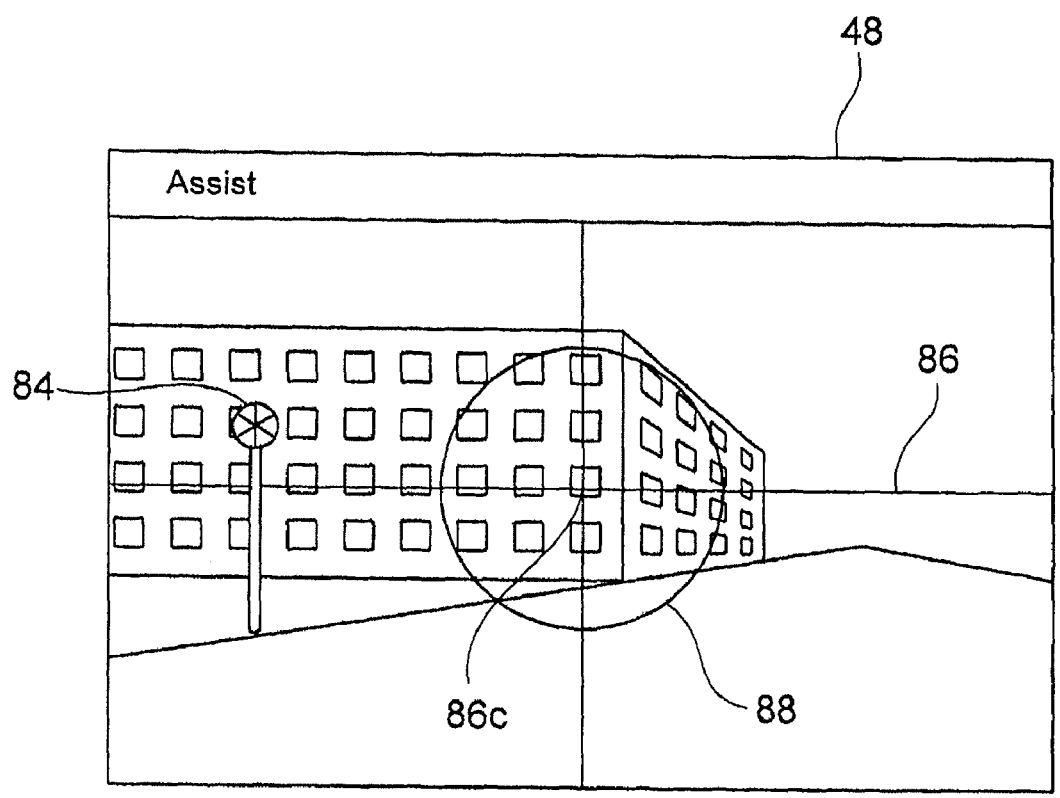
FIG. 2 is a view showing a state where an image captured by a wide-angle digital camera is displayed on a display unit of the surveying instrument.
Figure 3:
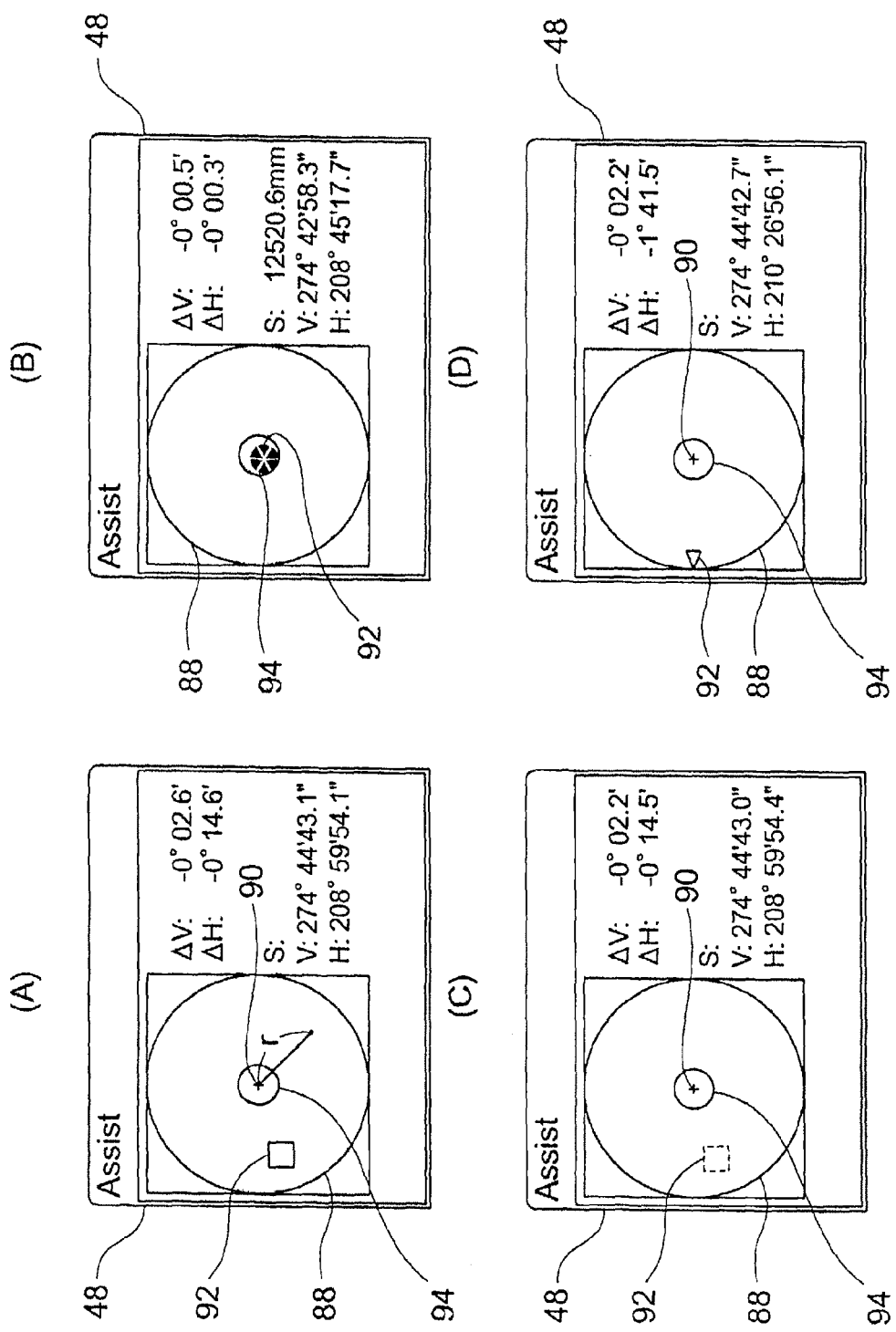
FIG. 3 are views each showing a state where an animation image to facilitate a collimating operation is displayed on the display unit.
Figure 4:
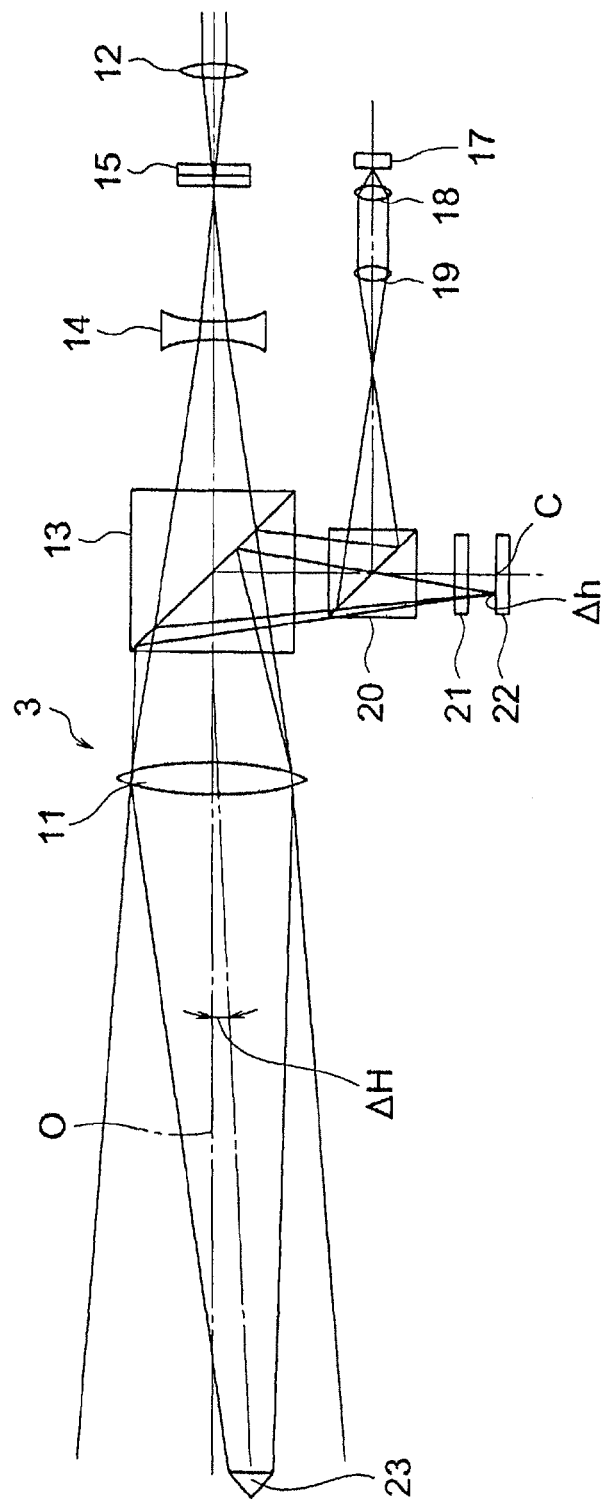
FIG. 4 is an optical path diagram of a conventional surveying instrument.

Hereinafter, by taking a total station, for example, as a manual surveying instrument (hereinafter, described simply as a surveying instrument) according to a first embodiment of the present invention, a preferred embodiment of the present invention will be described in detail with reference to the accompanying drawings. FIG. 1 is a block diagram of the surveying instrument. FIG. 2 is a view showing a state where an image captured by a wide-angle digital camera is displayed on a display unit. FIG. 3 are views each showing a state where an animation image to facilitate manual collimation is displayed on the display unit.

As shown in FIG. 1, the surveying instrument includes, as a collimating telescope 3 for manual collimation, an objective lens 11, a focusing lens 14, an erecting prism 16, a focusing glass 15, and an eyepiece 12 on a collimation axis O. An observer can perform manual collimation by looking through the eyepiece 12.

Moreover, the surveying instrument includes, as a distance measuring unit 30 for measuring a distance up to a target (not shown), a light emitting element 32 such as a light-emitting diode that emits a distance measuring light L of infrared laser light, a distance measuring light transmitting system consisting of a condenser lens 34 and a half-mirror 36 for transmitting the distance measuring light L along the collimation axis O and a mirror 38, a distance measuring light receiving system consisting of a dichroic mirror 40 that selectively reflects the distance measuring light L reflected from a target and a light receiving element 42 such as a photodiode that receives the distance measuring light L reflected on the dichroic mirror 40, and a distance detecting unit (distance measurement CPU) 44 that controls light emission of the light emitting element 32 and calculates the distance up to the target by an electrical signal from the light receiving element 42.

The distance measuring light emitted from the light emitting element 32 is transmitted, through the condenser lens 34, the half mirror 36, the mirror 38, and the objective lens 11, toward the target. Then, the distance measuring light L reflected on the target backtracks along the light path, and enters the dichroic mirror 40. Because the dichroic mirror 40 selectively reflects only the distance measuring light L, only the distance measuring light enters the light receiving element 42. The light receiving element 42 converts the distance measuring light L into an electrical signal, and transmits the electrical signal to the distance detecting unit 44. The distance detecting unit 44 transmits a modulation signal for modulating the distance measuring light L to the light emitting element 32, and calculates, based on a phase difference between the modulation signal transmitted to the light emitting element 32 and the electrical signal transmitted from the light receiving element 42, a distance up to the target, and transmits the distance to an arithmetic control unit (main CPU) 46. The arithmetic control unit 46 displays the measured distance on a display unit 48.

The arithmetic control unit 46 also receives a vertical angle and a horizontal angle transmitted from a vertical angle measuring unit (vertical encoder) 50 and a horizontal angle measuring unit (horizontal encoder) 52. The arithmetic control unit 46 also displays the received vertical angle and horizontal angle on the display unit 48. The arithmetic control unit 46 is also connected with a storage unit 54 and a communication unit 56, and can also store a measured value and the like in the storage unit 54 and communicate with an external device (not shown) via the communication unit 56.

What has been described in the above is the same as that of the conventional total station, the surveying instrument further includes a wide-angle digital camera 60 and a collimation assist device 70.

The wide-angle digital camera 60 consists of an objective lens 62, a focusing lens 64, and an area sensor 66 such as a CCD area sensor, and has an optical axis O1 parallel with the collimation axis O. In addition, the center of a light receiving surface of the area sensor 66 is located on the optical axis O1. An image obtained in the area sensor 66 is transmitted to the arithmetic control unit 46, further transmitted to the display unit 48, and displayed as shown in FIG. 2. In this wide-angle digital image, crosshairs 86 to indicate the collimation axis O and a field of view 88 of the collimating telescope 3 are also displayed. A center 86c of the crosshairs 86 of the collimating telescope 3 indicates the collimation axis O.

Because the optical axis O1 of the wide-angle digital camera 60 is offset from the collimation axis O, the arithmetic control unit 46 displays the crosshairs 86 on the display unit 48 in consideration of this offset. When the wide-angle digital camera 60 has an autofocus function, the arithmetic control unit 46 estimates a distance from a focus position of its optical system to a target 84, and displays the crosshairs 86 on the display unit 48 in consideration also of this distance. Of course, because the crosshairs 86 of an image obtained from the wide-angle digital camera 60 are roughly collimated, the arithmetic control unit 46 may simply display the crosshairs 86 in alignment with the optical axis O1 of the wide-angle digital camera 60, or may not display the crosshairs 86.

Therefore, the observer observes the image displayed on the display unit 48, while turning the collimating telescope 3 so as to capture the target 84 within the field of view 88 of the collimating telescope 3. Here, the arithmetic control unit 46, when having judged that the target 84 has been captured within the field of view 88 of the collimating telescope 3, starts the collimation assist device 70 to switch the image to be displayed on the display unit 48 from the image captured by the wide-angle digital camera 60 to an animation image captured by the collimating telescope 3. Of course, the collimation assist device 70 may be started by pushing a measurement start button (not shown) when the target 84 has been captured in the vicinity of the center 86c of the crosshairs 86. When the collimation assist device 70 starts up, the image on the display unit 48 is switched to an animation image based on the image captured by the collimating telescope 3, as shown in FIG. 3, and this is notified by a beep, a human voice, or an appropriate audio.

As shown in FIG. 1, the collimation assist device 70 includes a light emitting element 72 such as a light-emitting diode that emits a collimation light R of infrared laser light, a collimation light transmitting system consisting of a condenser lens 74 and mirrors 76, 38 for transmitting the collimation light R along the collimation axis O, a collimation light receiving system consisting of a dichroic mirror 78 that selectively reflects the collimation light R reflected along the collimation axis O from the target 84 and an area sensor 80 such as a CCD area sensor that receives the collimation light R reflected on the dichroic mirror 78, a collimation light detecting unit (collimation CPU) 82 that controls light emission of the light emitting element 72 and detects a horizontal angle deviation ΔH (illustration omitted) and a vertical angle deviation ΔV (illustration omitted) from the collimation axis O of the target 84 from an image obtained by the area sensor 80, and the foregoing arithmetic control unit 46 and display unit 48.

Then, the arithmetic control unit 46 is configured to be able to execute such as: displaying an image of the wide-angle digital camera 60 on the display unit 48, and displaying on this image the field of view 88 of the collimating telescope 3; when having judged that the target 84 has been captured within the field of view 88 of the collimating telescope 3, switching the image obtained by the wide-angle digital camera 60 to an animation image based on an image obtained by the collimating telescope 3, and notifying this by a beep, a human voice, or an appropriate audio, displaying, in this animation image, a symbol 92 indicating a direction of the target 84 according to a reflected light from the target 84 within the field of view 88 of the collimating telescope 3, and further displaying an area 94 where distance measurement is enabled; changing the symbol 92 indicating the target 84 in color, shape, or color and shape when the symbol 92 indicating the target 84 has entered into the area 94, and notifying this by a beep, a human voice, or an appropriate audio; changing the symbol 92 indicating the target 84 in color, shape, or color and shape when collimation light reflected from the target 84 is excessively weak or excessively strong, and notifying this by a beep, a human voice, or an appropriate audio; and when the target 84 has exited the field of view 88 of the collimating telescope 3, changing the symbol 92 indicating the target 84 in color, shape, or color and shape, indicating a direction to return the collimating telescope 3, and further notifying this by a beep, a human voice, or an appropriate audio.

The collimation light R emitted from the light emitting element 72 is transmitted, through the condenser lens 74, the mirrors 76, 36, 38, and the objective lens 11, toward the target 84. The collimation light R reflected on the target 84 backtracks along the light path, and enters the dichroic mirror 78 after being transmitted through the objective lens 11, the dichroic mirror 40, and the focusing lens 14. The dichroic mirror 78 selectively reflects the collimation light R and makes the collimation light R enter the area sensor 80. The area sensor 80 has been set so that the collimation light R having reversed along the collimation axis O enters the center of its light receiving surface. An image obtained in the area sensor 80 is transmitted to the collimation light detecting unit 82, converted to an animation image where the target 84 is made easy to view by the arithmetic control unit 46, and then displayed on the display unit 48 as shown in FIGS. 3(A), (B), (C), and (D).

FIG. 3(A) shows immediately after switching from the image captured by the wide-angle digital camera 60 to the image captured by the collimating telescope 3. The symbol 92 indicating the target 84 is made to stand out by a colored quadrangle. Of course, the shape of the symbol 92 may be a circle, a triangle, or other appropriate shapes. For conversion from an image obtained from the area sensor 80 to an animation image, the collimation light detecting unit 82 determines a horizontal angle deviation ΔH and a vertical angle deviation ΔV from the collimation axis O of the target 84, and transmits both deviations ΔH, ΔV to the arithmetic control unit 46. The arithmetic control unit 46, based on both deviations ΔH, ΔV, displays the symbol 92 indicating the target 84 on the display unit 48. Moreover, on the display unit 48, the horizontal angle deviation ΔH, the vertical angle deviation ΔV, and a horizontal angle H and a vertical angle V corrected based also on both deviations ΔH, ΔV are displayed also in numerical values. Further, on the display unit 48, the area 94 where distance measurement is possible by the distance measuring unit 30 is displayed together with a point 90 indicating the collimation axis O. This area 94 is normally a circle around the point 90 indicating the collimation axis O, which represents being within a predetermined deviation from the collimation axis O, but in some cases, an appropriate shape such as a quadrangle can be selected. In the display unit 48, a deviation r from the point 90 indicating the collimation axis O is not displayed in proportion to an actual deviation, but the deviation r is enlarged as it approaches the point 90 indicating the collimation axis O, and displayed so as to be proportional to, for example, a logarithm of an actual deviation. The observer turns the collimating telescope 3 so that the symbol 92 indicating the target 84 enters into the area 94 where distance measurement is possible. This is because, in the case of an electronic distance meter, unless the target 84 is within a predetermined shift amount from the collimation axis O, a cyclic error occurs, which can cause errors.

The arithmetic control unit 46 monitors whether the symbol 92 indicating the target 84 has entered into the area 94 where distance measurement is possible, and when having judged that the symbol 92 has entered into the area 94 where distance measurement is possible, as shown in FIG. 3(B), changes the symbol 92 in color, shape, or color and shape, and notifies this by a beep, a human voice, or an appropriate audio, and further transmits a command to the distance detecting unit 44 to automatically perform distance measurement. Of course, the distance measurement may be performed not automatically but by pressing a measurement button (not shown). When the symbol 92 indicating a plurality of targets 84 has entered the area 94 where distance measurement is possible, an alarm is displayed on the display unit 48 and this alarm is issued also by an audio to suspend has been completed, the completion of measurement is notified also by an audio by an audio output unit 58. A distance S obtained in the distance detecting unit 44 is transmitted to the arithmetic control unit 46. The arithmetic control unit 46, by applying to the vertical angle and the horizontal angle transmitted from the vertical angle measuring unit 50 and the horizontal angle measuring unit 52 an addition subtraction correction through substituting the vertical angle deviation ΔV and the horizontal angle deviation ΔH transmitted from the collimation light detecting unit 82 for a predetermined function, calculates an accurate vertical angle V and horizontal angle H. The distance S, vertical angle V, horizontal angle H, vertical angle deviation ΔV, and vertical angle deviation ΔH are also displayed also in numerical values on the display unit 48. These measurement values are stored also in the storage unit 54.

When the reflected collimation light R is excessively weak for the reason such that the target 84 is excessively distant, the arithmetic control unit 46, as shown in FIG. 3(C), changes the symbol 92 in color, shape, or color and shape, and issues an audio alarm to notify in advance that the precision of distance measurement will degrade. Conversely, when the reflected collimation light R is excessively strong for the reason such that the target 84 is excessively close, the arithmetic control unit 46 also changes the symbol 92 in color, shape, or color and shape, and issues an audio alarm to notify in advance that the precision of distance measurement will degrade.

When the target 84 is removed from the field of view 88 of the collimating telescope 3 by mistake, the arithmetic control unit 46, as shown in FIG. 3(D), changes the symbol 92 in color, shape, or color and shape, and issues an audio alarm, and the target 84 is displayed at a position immediately before being removed from the field of view 88 of the collimating telescope 3 by a symbol such as a triangle or an arrow indicating a direction reverse to the turning direction of the collimating telescope 3. In the case of immediately after removing the target 84 from the field of view 88 of the collimating telescope 3, by turning the collimating telescope 3 in a direction indicated by the symbol 92, the target 84 can be again easily captured within the field of view 88 of the collimating telescope 3.

According to the present embodiment, the collimation assist device 70 is provided, so as to display the point 90 indicating the collimation axis O and the symbol 92 indicating the target 84 on the display unit 48 as an animation image, judge that the collimation has been completed when the symbol 92 indicating the target 84 has been captured, by a manual operation of the collimating telescope 3, within a predetermined deviation from the point 90 indicating the collimation axis O to perform a distance and angle measurement, and correct the angle measurement value according to a deviation from the collimation axis O of the target 84, and thus the observer can observe the animation image on the display unit 48 with both eyes while collimating the target 84, even somewhat imperfect collimation will suffice, and a high-precision distance and angle measurement can be performed in a short time by an easy collimating operation. In particular, the animation image, which consists of the point 90 indicating the collimation axis O, the area 94 where distance measurement by the distance measuring unit 30 is enabled, and the symbol 92 indicating the target 84, is displayed with the deviation r from the collimation axis O enlarged as it approaches the collimation axis O, and thus the collimating operation is even easier.

Moreover, the symbol 92 indicating the target 84 is made to change in color, shape, or color and shape when having entered into the area 94 where distance measurement by the distance measuring unit 30 is enabled, and this is notified by an audio, and thus the completion of collimation is found, and collimating operation is even easier. Further, the symbol 92 indicating the target 84 is made to change in color, shape (for example, an arrow), or color and shape when the target 84 has exited the field of view 88 of the collimating telescope 3, and an audio alarm is issued, and a direction to return the collimating telescope 3 is indicated, and thus it can be immediately found that the target 84 has exited the field of view 88 of the collimating telescope 3, and an operation to return the target 84 into the field of view 88 of the collimating telescope 3 can be promptly performed, so that the collimating operation is even easier. Further, the symbol 92 indicating the target 84 is made to change in color, shape, or color and shape when the collimation light R reflected from the target 84 is excessively weak or excessively strong, and an audio alarm is issued, and thus it can be known in advance that measurement with sufficient precision is difficult, and measurement with low precision can be prevented.

Further, the wide-angle digital camera 60 is provided, so that the arithmetic control unit 46 first displays an image obtained from the wide-angle digital camera 88 on the display unit 48, and switches the image obtained by the wide-angle digital camera 60 to an animation image based on the image obtained by the collimating telescope 3 when having judged that the target 84 has been captured within the field of view 88 of the collimating telescope 3 displayed on the display unit 48, and thus the target 84 can be swiftly captured within the field of view 88 of the collimating telescope 3 and collimated, and the collimating operation is even easier and measurement can be performed in a short time.

Next, a second embodiment of the present invention will be described based on FIG. 5. The surveying instrument of the present embodiment, in which illustration indicating a direction to turn a collimating telescope is also displayed on the display unit 48, and except for which is almost the same as the surveying instrument of the first embodiment. Therefore, the same parts as those of the first embodiment are simply denoted by the same reference numerals as those of the first embodiment in FIG. 5 and description thereof will be omitted, and only the parts different from that of the first embodiment will be described.

The illustration to be displayed when the vertical angle deviation and horizontal angle deviation from the collimation axis of the target are both less than a predetermined value includes, as shown in FIG. 5(A), in addition to the point 90 indicating the collimation axis, the symbol 92 indicating the target, and the area 94 where distance measurement is possible, an illustration 102 showing a vertical tangent screw, an illustration 104 showing a horizontal tangent screw, and arrows 102*a*, 104*a* indicating turning directions of the tangent screws 102, 104, respectively. Further, numerical values indicating a vertical angle deviation and horizontal angle deviation from the collimation axis of the target are also displayed on the display unit 48. It suffices that the observer turns the tangent screws 102, 104 in the directions of the arrows 102*a*, 104*a*. Also, in the present embodiment, the area 94 where distance measurement is possible is provided in a square. This is for simplifying the program to shorten the measuring time. Moreover, crosshairs 96 are also displayed on the display unit 48 in order to facilitate manual collimation by the observer.

The illustration to be displayed when the vertical angle deviation and horizontal angle deviation from the collimation axis of the target are both equal to or more than a predetermined value includes, as shown in FIG. 5(C), illustrations 106, 108 showing a collimating telescope, and arrows 106*a*, 108*a* indicating turning directions in the vertical direction and horizontal direction of the collimating telescope, respectively. It suffices that the observer grasps the collimating telescope directly by hand and turns the collimating telescope in the directions of the arrows 106*a*, 108*a*. When the collimating telescope has gradually turned in the collimation axis direction and the vertical angle deviation or horizontal angle deviation from the collimation axis of the target has reached less than the predetermined value, the illustrations 106, 108 showing a collimating telescope switch to the illustrations 102, 104 showing tangent screws, and this is notified by a beep, a human voice, or an appropriate audio.

The case where one of the vertical angle deviation and horizontal angle deviation from the collimation axis of the target is equal to or more than a predetermined value and the other is less than the predetermined value is shown in FIG. 5(B). In this figure, the case where the vertical angle deviation is equal to or more than a predetermined value and the horizontal angle deviation is less than the predetermined value, and an illustration 106 of a collimating telescope and an arrow 106*a* indicating a turning direction of the collimating telescope are displayed in terms of the vertical direction having a deviation equal to or more than a predetermined value, and an illustration 104 of a tangent screw and an arrow 104*a* indicating a turning direction of the tangent screw 104 are displayed in terms of the horizontal direction having a deviation less than the predetermined value.

Figure 5:
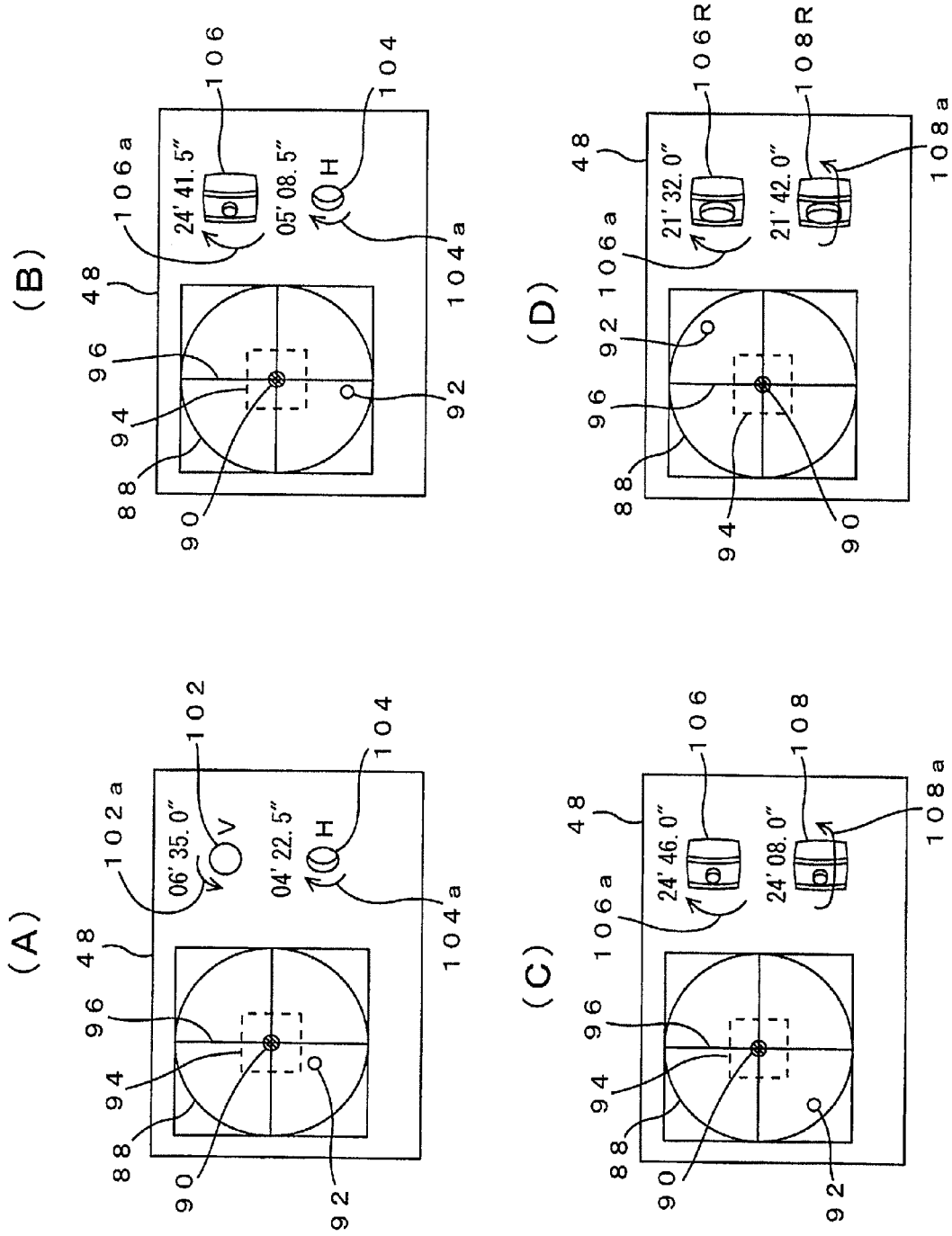
FIG. 5 are views each showing a state where an animation image to facilitate a collimating operation is displayed on a display unit of a surveying instrument according to a second embodiment of the present invention.

Meanwhile, what is shown in FIGS. 5(A) to (C) are cases where the collimating telescope is at a normal position, and illustrations of the collimating telescope observed from the eyepiece side are shown. When the collimating telescope is reversed, as shown in FIG. 5(D), the illustration of the collimating telescope 3 is also changed to an illustration observed from the objective lens side. However, for the collimating telescope present at either the normal or reversed position, the same illustration may be used. In any case, numerical values indicating a vertical angle deviation and horizontal angle deviation from the collimation axis of the target are also displayed on the display unit 48. Of course, in the present embodiment, it is also possible not to display illustrations as shown in FIG. 5 when the observer feels that such illustrations are unnecessary.

According to the present embodiment, because whether to directly turn the collimating telescope or turn the tangent screw and its turning direction is displayed by illustration on the display unit 48, even a beginner almost never makes an error in a collimating operation, so that the collimating operation becomes even easier.

Meanwhile, the present invention is not limited to the above-mentioned embodiment, and can be variously modified. For example, in the above-mentioned embodiment, the present invention has been applied to a total station, but the present invention can also be applied to an electronic theodolite (transit). In this case, the present invention can be achieved by replacing a collimating telescope optical system of the electronic theodolite with the collimating telescope optical system of the above-mentioned embodiment and replacing a display unit of the electronic theodolite with the display unit of the above-mentioned embodiment. Moreover, in the above-mentioned embodiment, the point 90 indicating the collimation axis O and the area 94 where distance measurement by the distance measuring unit 30 is enabled have been displayed, but the area 94 where distance measurement is enabled may not be displayed. Further, in the above-mentioned embodiment, the wide-angle digital camera 60 is provided so as to easily capture the target 84 within the field of view 88 of the collimating telescope 3, but the wide-angle digital camera 60 may be omitted for a cost reduction, so as to capture the target 84 within the field of view 88 of the collimating telescope 3 by a collimation device (for which a front sight and a rear sight or an optical collimator is provided so that the target 84 enters into the field of view 88 of the collimating telescope 3).

The invention claimed is:

1. A manual surveying instrument including a collimation assist device having a collimation light transmitting system that emits a collimation light along a collimation axis toward a target installed at a measurement point, an area sensor that obtains an image of a scene captured within a field of view of a collimating telescope, a display unit that displays the image, a collimation light detecting unit that detects the target as a result of receiving the collimation light reflected on the target by the area sensor, and an arithmetic control unit that displays an area indicating being within a predetermined deviation from the collimation axis and a symbol indicating the target on the display unit as an animation image, judges that collimation has been completed when the target has been captured, by a manual operation of the collimating telescope, within the area indicating being within a predetermined deviation from the collimation axis to perform an angle measuring operation, and corrects an angle measurement value according to a deviation from the collimation axis of the target.

2. The manual surveying instrument including a collimation assist device according to claim 1, wherein the animation image is displayed with a deviation from the collimation axis enlarged as it approaches the collimation axis.

3. The manual surveying instrument including a collimation assist device according to claim 1, wherein the symbol indicating the target changes in color, shape, or color and shape when having entered into the area indicating being within a predetermined deviation from the collimation axis.

4. The manual surveying instrument including a collimation assist device according to claim 1 wherein the symbol indicating the target changes in color, shape, or color and shape when the target has exited the field of view of the collimating telescope, and indicates a direction to return the collimating telescope.

5. The manual surveying instrument including a collimation assist device according to claim 1, wherein the symbol indicating the target changes in color, shape, or color and shape when the collimation light reflected from the target is excessively weak or excessively strong.

6. The manual surveying instrument including a collimation assist device according to claim 1 including a wide-angle digital camera, wherein the arithmetic control unit first displays an image obtained from the wide-angle digital camera on the display unit, displays the field of view of the collimating telescope on the display unit, and switches the image obtained from the wide-angle digital camera to the animation image when having judged that the target has been captured within the field of view of the collimating telescope.

7. The manual surveying instrument including a collimation assist device according to claim 1 including a distance measuring unit in an optical system of the collimating telescope, wherein the area indicating being within a predetermined deviation from the collimation axis is determined by an area where distance measurement by the distance measuring unit is enabled.

8. The manual surveying instrument including a collimation assist device according to claim 7, wherein when the symbol indicating the target has entered into the area indicating being within a predetermined deviation from the collimation axis, distance measurement can be automatically performed.

9. The manual surveying instrument including a collimation assist device according to claim 1, wherein an illustration indicating a turning direction of the collimating telescope is displayed on the display unit in order to locate the target on the collimation axis.

10. The manual surveying instrument including a collimation assist device according to claim 9, wherein the illustration indicating a turning direction of the collimating telescope is an illustration of a collimating telescope and an arrow indicating a turning direction of the collimating telescope or an illustration of a tangent screw and an arrow indicating a turning direction of the tangent screw.

* * * * *